United States Patent
Shimamura

(10) Patent No.: US 10,438,376 B2
(45) Date of Patent: Oct. 8, 2019

(54) IMAGE PROCESSING APPARATUS REPLACING COLOR OF PORTION IN IMAGE INTO SINGLE COLOR, IMAGE PROCESSING METHOD, AND STORAGE MEDIUM

(71) Applicant: CANON KABUSHIKI KAISHA, Tokyo (JP)

(72) Inventor: Koya Shimamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 15/648,285

(22) Filed: Jul. 12, 2017

(65) Prior Publication Data
US 2018/0025509 A1    Jan. 25, 2018

(30) Foreign Application Priority Data
Jul. 25, 2016   (JP) .................. 2016-145740

(51) Int. Cl.
| | |
|---|---|
| G06K 9/00 | (2006.01) |
| G06T 11/00 | (2006.01) |
| G06T 7/90 | (2017.01) |
| G06K 9/46 | (2006.01) |
| G06T 5/00 | (2006.01) |
| G06T 5/40 | (2006.01) |
| H04N 1/60 | (2006.01) |

(Continued)

(52) U.S. Cl.
CPC .......... *G06T 11/001* (2013.01); *G06K 9/4652* (2013.01); *G06K 9/48* (2013.01); *G06T 5/002* (2013.01); *G06T 5/40* (2013.01); *G06T 7/136* (2017.01); *G06T 7/187* (2017.01); *G06T 7/194* (2017.01); *G06T 7/90* (2017.01); *H04N 1/6011* (2013.01); *H04N 1/6019* (2013.01); *H04N 1/6086* (2013.01); *H04N 1/62* (2013.01); *G06T 2207/10024* (2013.01); *G06T 2207/20192* (2013.01)

(58) Field of Classification Search
CPC ....... G06T 11/00; G06T 11/001; G06T 5/002; G06T 5/40; G06T 7/90; G06T 2207/20192; G06T 2207/10024; H04N 1/60; H04N 1/6019; H04N 1/6086; H04N 1/6011; G06K 9/4652
See application file for complete search history.

(56) References Cited

U.S. PATENT DOCUMENTS

| | | | |
|---|---|---|---|
| 2008/0212873 A1* | 9/2008 | Allen .................. | G06T 9/20 382/162 |
| 2010/0054587 A1* | 3/2010 | Fukuoka ............. | G06K 9/342 382/164 |

(Continued)

FOREIGN PATENT DOCUMENTS

JP    2015207961 A    11/2015

*Primary Examiner* — Amir Alavi
(74) *Attorney, Agent, or Firm* — Canon U.S.A., Inc. IP Division

(57) ABSTRACT

An image processing method for processing an image includes determining, selecting, and replacing. It is determined whether a portion, including a plurality of pixels and darker than a threshold in the image, is subject to a color replacement. One predetermined color from among a plurality of predetermined colors is selected, based on a color of at least a part of the plurality of pixels. Based on the determination, a color of the portion is replaced with the selected one predetermined color.

16 Claims, 16 Drawing Sheets

(51) Int. Cl.
*G06K 9/48* (2006.01)
*H04N 1/62* (2006.01)
*G06T 7/187* (2017.01)
*G06T 7/194* (2017.01)
*G06T 7/136* (2017.01)

(56) References Cited

U.S. PATENT DOCUMENTS

| | | | |
|---|---|---|---|
| 2012/0327478 A1* | 12/2012 | Shepherd | H04N 1/405 358/3.06 |
| 2014/0044351 A1* | 2/2014 | Ito | G06K 9/4652 382/165 |
| 2016/0152062 A1* | 6/2016 | Katayama | G03G 15/6585 347/179 |
| 2016/0155344 A1* | 6/2016 | Mihai | G09B 5/02 434/365 |
| 2016/0247271 A1* | 8/2016 | Hishida | G01N 23/04 |
| 2017/0090345 A1* | 3/2017 | Katayama | G03G 15/6585 |
| 2018/0025509 A1* | 1/2018 | Shimamura | H04N 1/62 382/163 |

* cited by examiner

ENLARGEMENT OF PART
OF AREA IN FIG. 9C

RGB = {50, 60, 40}
RGB = {100, 120, 90}

RGB = {200, 30, 20}
RGB = {180, 40, 40}

ENLARGEMENT OF PART
OF AREA IN FIG. 9E

RGB = {0, 0, 0}
RGB = {0, 0, 0}

RGB = {255, 0, 0}
RGB = {255, 0, 0}

FIG.10A

| | WHITEBOARD MARKER DRAWING AREA (CHARACTER) | WHITEBOARD MARKER DRAWING AREA (LINE DRAWING) | PICTURE PASTING AREA | WHITEBOARD SURFACE |
|---|---|---|---|---|
| INPUT IMAGE | 701 DRA DRA | 702 | 703 | 704 NO DRAWING |
| BINARIZATION PROCESSING | 705 DRA DRA | 706 | 707 | 708 NO DRAWING |

IMAGE PROCESSING APPARATUS REPLACING COLOR OF PORTION IN IMAGE INTO SINGLE COLOR, IMAGE PROCESSING METHOD, AND STORAGE MEDIUM

BACKGROUND OF THE INVENTION

Field of the Invention

The disclosed information relates to an image processing technique for replacing a color of a portion in an image.

Description of the Related Art

Recently, mobile terminals having advanced information processing functions, such as smartphones and tablet personal computers (PCs) have become common. These mobile terminals are provided with cameras and have image capturing functions (camera functions). These mobile terminals are starting to be used to capture whiteboard surfaces on which characters and drawings are drawn with whiteboard marker pens (hereinbelow, referred to as markers) using the camera functions and store as image data on memories thereof.

The mobile terminal is affected by an environment when capturing an image of a whiteboard surface using the camera function. For example, a character and a drawing drawn with the marker on the whiteboard surface may be captured in a color different from an original color of the marker by influence of a light source illuminating the whiteboard surface. For example, it may be difficult to distinguish between a character written with a blue marker and a character written with a black marker on the captured image in some cases.

A technique for correcting a color in an original image is described in Japanese Patent Application Laid-Open No. 2015-207961. In the technique, it is described that a pixel of which a color is replaced is extracted based on whether the color of the pixel in an image is included in a color range of a fluorescent color, and the color of the extracted pixel is replaced with a predetermined color.

SUMMARY OF THE INVENTION

According to an aspect of the present invention, an image processing method for processing an image includes determining whether a portion, including a plurality of pixels and darker than a threshold in the image, is subject to a color replacement, selecting one predetermined color from among a plurality of predetermined colors, based on a color of at least a part of the plurality of pixels, and replacing, based on the determination, a color of the portion with the selected one predetermined color.

Further features of the present invention will become apparent from the following description of embodiments with reference to the attached drawings.

DESCRIPTION OF THE EMBODIMENTS

Figure 1:
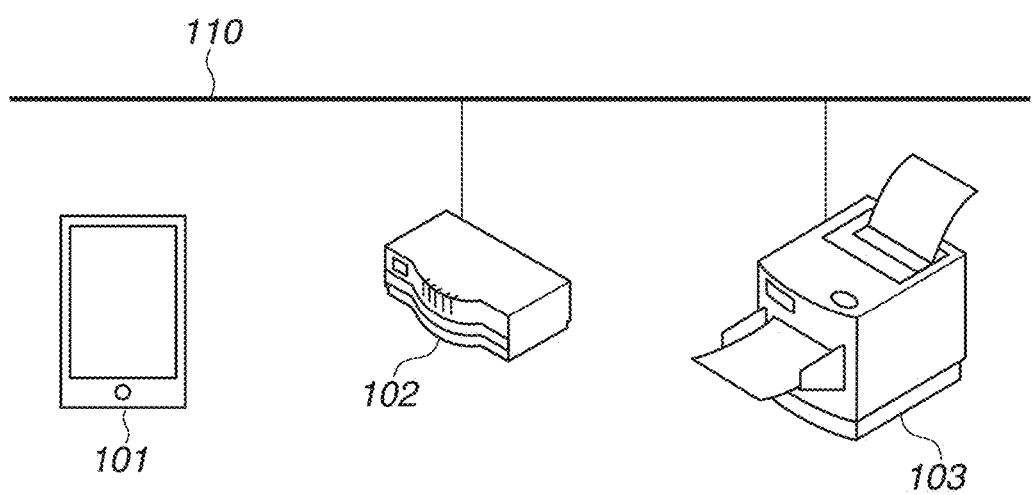
FIG. 1 illustrates an example of a system configuration.

FIG. 1 illustrates an entire configuration of a system applied to a first embodiment. A local area network (LAN) 110 is connected to a wireless router 102 and a printer 103. A mobile terminal 101 can be connected to the printer 103 via the wireless router 102 and the LAN 110. The mobile terminal 101 functions as an image processing apparatus according to embodiments described below.

<Configuration of Mobile Terminal>

Figure 2A:
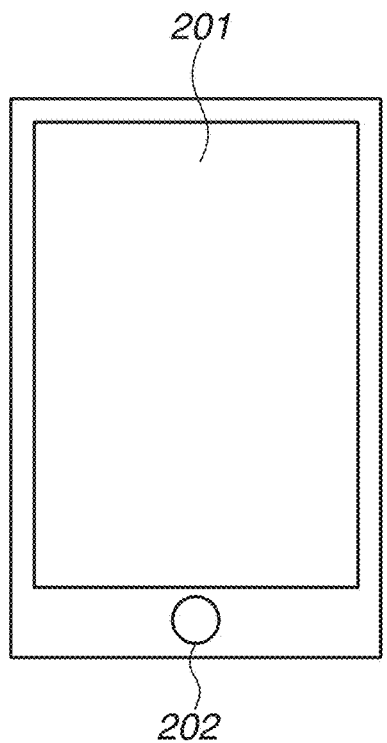
FIGS. 2A and 2B illustrate examples of external appearances of a mobile terminal.
Figure 2B:
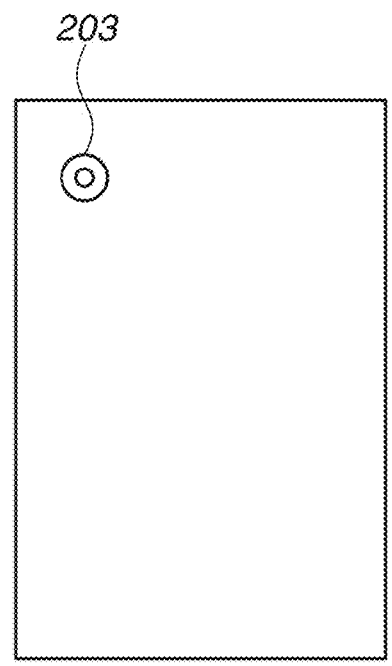

FIGS. 2A and 2B illustrate external appearances of the mobile terminal 101 applied to the present embodiment. There are various types of the mobile terminals 101, and FIG. 2A illustrates a front surface of the mobile terminal 101. The mobile terminal 101 includes a touch panel display 201 and an operation button 202 on the front surface. Particularly, the touch panel display 201 is a device as a combination of a display device for displaying information, a button, an image, and the like necessary for an operation and a device for inputting coordinates of a position on a screen at which a person touches with a finger or the like. FIG. 2B illustrates a back surface of the mobile terminal 101. On the back surface, an image capturing unit (also referred to as a camera) 203 is arranged. The disclosed information can be applied to a mobile terminal having a camera function including the image capturing unit 203. In other words, the disclosed information can be applied to any of a smartphone and a mobile phone having a camera function and a digital camera having a communication function. In addition, the disclosed information can be applied to a document camera which can capture an image of a whiteboard surface in a non-contact manner.

<Hardware Configuration of Mobile Terminal 101>

Figure 3:
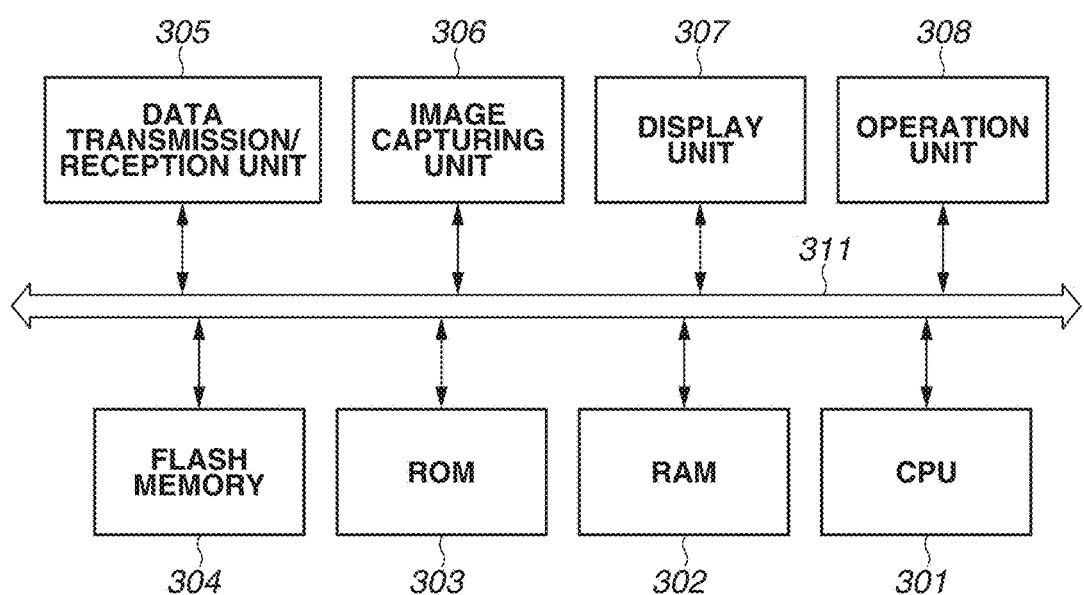
FIG. 3 illustrates an example of a hardware configuration of the mobile terminal.

FIG. 3 illustrates a hardware configuration of an inside of the mobile terminal 101. However, the configuration diagram is an example of the configuration for implementing the present embodiment. In FIG. 3, a central processing unit (CPU) 301, a random access memory (RAM) 302, and a read-only memory (ROM) 303 transmit and receive programs and data pieces via a data bus 311. The data bus 311 is also connected to a flash memory 304, a data transmission/reception unit 305, an image capturing unit 306, a display unit 307, and an operation unit 308 and transmit and receive programs and data pieces with each other including the CPU 301, the RAM 302, and the ROM 303.

The flash memory 304 is a built-in flash memory or an external secure digital (SD) flash memory card and stores image data and various programs.

The data transmission/reception unit 305 includes a wireless LAN controller and realizes transmission and reception of data between the printer 103 via the wireless router 102. Other than the wireless LAN, Bluetooth (registered trademark), Near Field Communication (NFC), and others which can realize transmission and reception of data can be adopted.

The image capturing unit 306 which is the above-described camera 203 captures an image of a whiteboard surface and obtains a captured image. Data of the obtained captured image is stored in the flash memory 304 and the RAM 302 and processed by the CPU 301. The processed image data is subjected to post processing such as display on the display unit 307, storage in the flash memory 304, transmission to the outside via the data transmission/reception unit 305 by the CPU 301.

The display unit 307 is a display constituting the touch panel display 201 and displays a live view image when the whiteboard surface is captured using the camera function, an image processing result according to the present embodiment, notification of processing process, information necessary for the operation, and the like.

The operation unit 308 which includes a touch panel and the operation button 202 constituting the above-described touch panel display 201 receives an operation from a user and transmits information of the operation to each unit.

The CPU 301 executes a program (for example, a camera imaging application 403 and an image correction application 404) stored in the ROM 303 and the flash memory 304, and thus processing of each flowchart described below is executed. In addition, the CPU 301 controls components in the mobile terminal 101.

<Software Configuration of Mobile Terminal 101>

Figure 4:
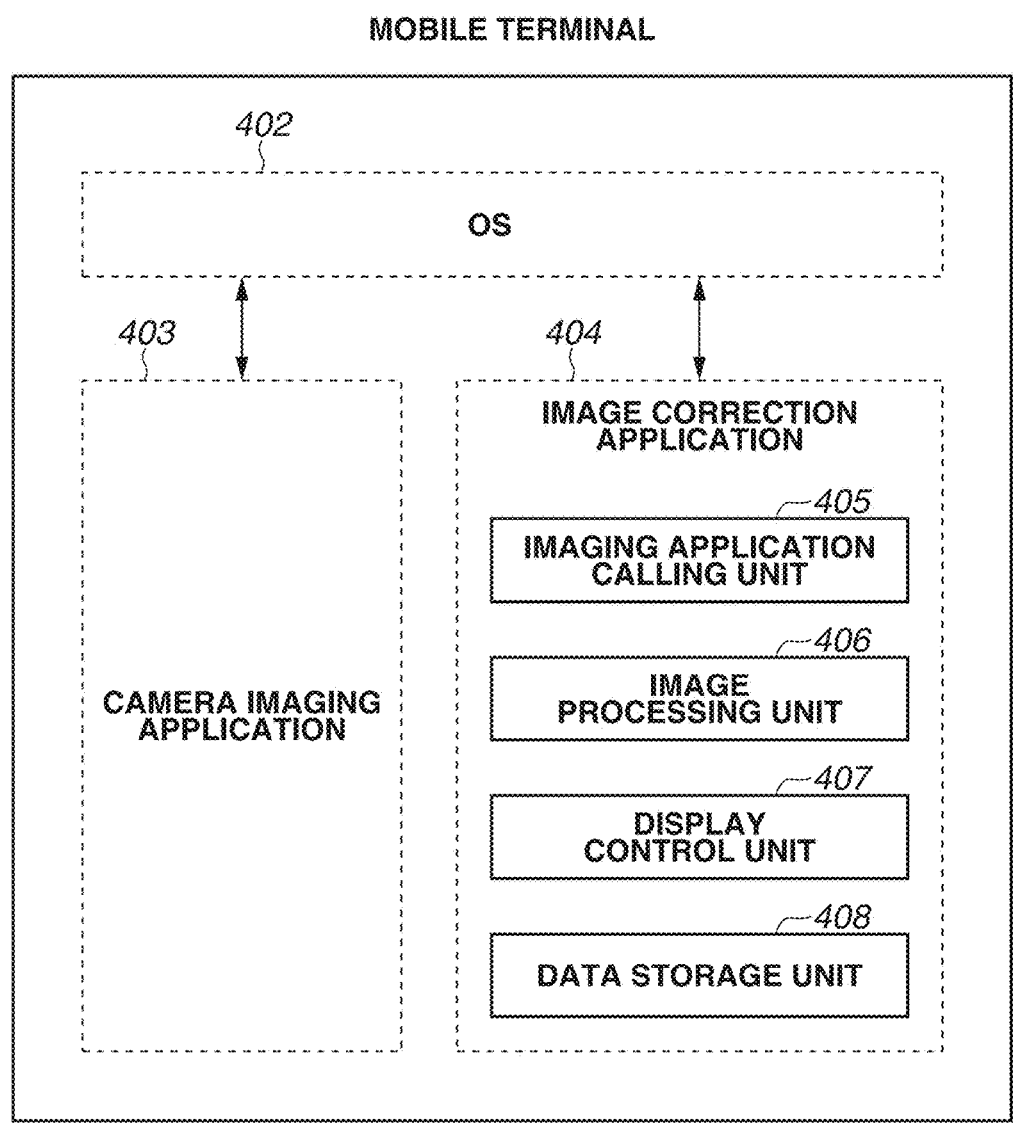
FIG. 4 illustrates an example of a software configuration of the mobile terminal.

FIG. 4 illustrates a software configuration for executing processing of the mobile terminal 101. However, the configuration diagram is an example of the configuration for implementing the present embodiment. Software modules are stored in the flash memory 304 of the mobile terminal 101 and executed by the CPU 301.

An operating system (OS) 402 manages the entire system and operations of the mobile terminal and controls the camera imaging application 403 and the image correction application 404 described below.

The camera imaging application 403 operates the image capturing unit 306 by an instruction from the OS 402, and thus the camera 203 is driven and captures an image. The camera imaging application 403 receives image data from the camera 203 and stores the image data in the flash memory 304.

The image correction application 404 includes an imaging application calling unit 405, an image processing unit 406, a display control unit 407, and a data storage unit 408. The image correction application 404 performs calling processing of the imaging application, image processing on the captured image, drawing of the image subjected to the image processing on the display, and storing by an instruction from the OS 402. The image correction application 404 is received from an external server, which is not illustrated, and installed according to an instruction from the OS 402. The CPU 301 executes the image correction application 404 using the RAM 302 and the flash memory 304.

The imaging application calling unit 405 is called in the image correction application 404 and instructs the OS 402 to execute the camera imaging application 403. The imaging application calling unit 405 calls the camera imaging application 403 via the OS 402 to capture an image.

The image processing unit 406 is called in the image correction application 404 and performs image processing on the captured image and an image stored in the flash memory 304.

The display control unit 407 is called in the image correction application 404 and displays the captured image, the image stored in the flash memory 304, and an image subjected to the processing (color replacement) by the image processing unit 406 on the display unit 307.

The data storage unit 408 is called in the image correction application 404 and stores the image subjected to the processing by the image processing unit 406 in the flash memory 304.

<Detail Description of Processing Flow>

FIGS. 5, 6, 7, and 8 are flowcharts illustrating processing for correcting an input image according to the present embodiment. These flowcharts are executed by the image processing unit 406.

Outline of the processing described below is as follows. One or more foreground pixel groups are extracted based on an adjacent relationship among the foreground pixel groups in an input image, and it is determined, per pixel group, whether the pixel group is constituted of similar color pixels. The pixel group constituted of the similar color pixels is regarded as an area drawn with a marker, and a color thereof is replaced. By the above-described processing, a portion drawn with the marker can be distinguished from a portion such as a picture, and the portion drawn with the marker can be selectively corrected.

Figure 5:
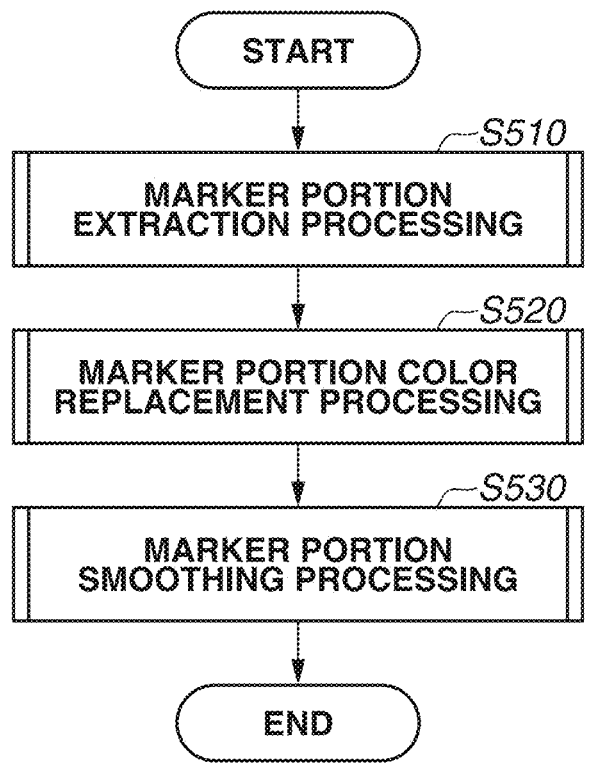
FIG. 5 is a flowchart illustrating entire processing according to a first embodiment.

FIG. 5 illustrates an entire flow of correction processing performed on an input image. An image capturing the whiteboard surface by the camera function including the image capturing unit 203 and an image stored in the flash memory 304 are processed as the input image. Alternatively, an image received from the outside is processed as the input image. As an instruction from the camera function, image capturing is executed by an instruction from the camera imaging application 403. The input image is premised on including an image of the whiteboard surface. When the captured image includes a background area other than the whiteboard surface, an area of the whiteboard surface is extracted, and the input image is obtained by performing trapezoidal correction on the extracted area to be a rectangular area. It is considered that the whiteboard surface is constituted of four outmost sides in the captured image. Thus, the image processing unit 406 performs edge extraction processing on the captured image and specifies four sides which have predetermined lengths or more and are respectively on the outmost sides of vertical and horizontal sides in the captured image from among the extracted edges. The image processing unit 406 extracts a rectangle constituted of the specified four sides on the vertical and horizontal sides as an image of the whiteboard surface. Further, the image processing unit 406 performs projective transformation (trapezoidal correction) on the extracted image and obtains a rectangular image as a processing target input image.

Figure 9A:
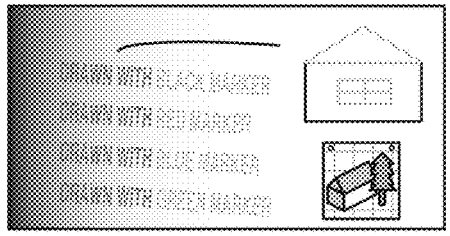
FIGS. 9A to 9F illustrate examples of processing according to the first embodiment.
Figure 9B:
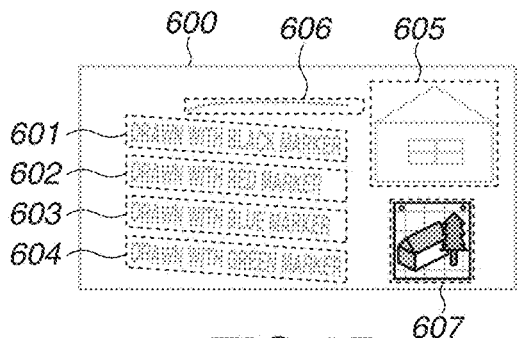

FIG. 9A illustrates an example of the input image. FIG. 9B indicates an attribute of each portion in FIG. 9A. A frame of the whiteboard surface is indicated by a reference numeral 600. Characters written with the marker are indicated by reference numerals 601 to 604 which respectively indicate characters written in black, characters written in red, characters written in blue, and characters written in green. Line drawings drawn with the marker are indicated by reference numerals 605 and 606. A color picture pasted on the whiteboard surface is indicated by a reference numeral 607. Drawing densities of the portions drawn with the marker indicated by the reference numerals 601 to 606 are thin depending on states of the markers and drawing methods, and thick portions and thin portions are mixed. It can be seen that there are a shadow on the background of a character portion and a picture portion due to an imaging environment. The shadow on the background can be removed using a shadow removal technique.

Figure 9C:
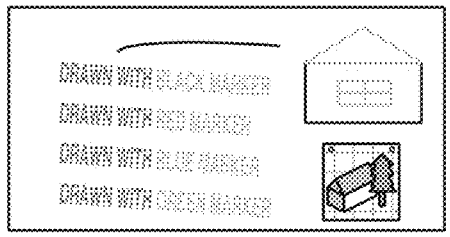

FIG. 9C is an image obtained by removing the shadow from the image in FIG. 9A which is an image handled as the input image described in the present embodiment. The shadow removal technique may be a known shadow removal technique, for example, a method for removing a shadow by extracting a long period luminance component (shadow component) from an image and subtracting the extracted shadow component from the image, and a method for adjusting brightness and contrast. In FIG. 9C, the drawing densities of the areas drawn with the markers indicated by the reference numerals 601 to 606 are thin depending on the states of the markers and the drawing methods, and it can be seen that there are portions of which densities are thin and visibility are low.

Figure 9D:
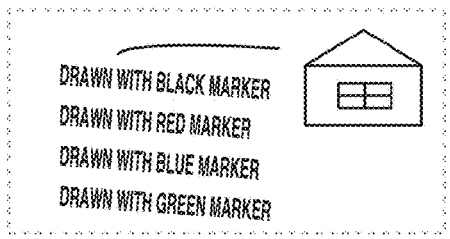

Marker portion extraction processing in step S510 extracts the area drawn with the marker from the input image. The marker portion extraction processing is described in detail below with reference to a flowchart illustrated in FIG. 6. Black solid line portions in FIG. 9D indicate the areas drawn with the markers extracted from the input image in FIG. 9C. It can be seen that the areas drawn with the markers indicated by the reference numerals 601 to 606 are only extracted, and the picture portion of the reference numeral 607 is not extracted.

Figure 9E:
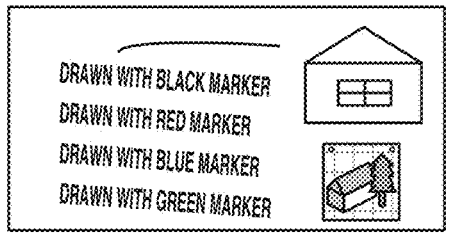
Figure 9F:
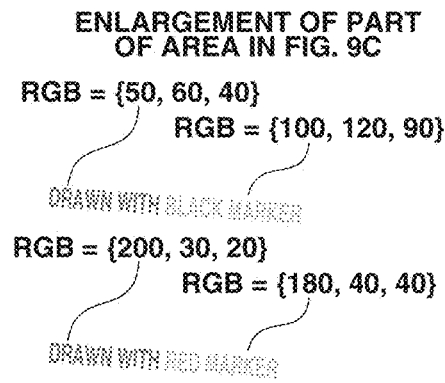
Figure 9F:
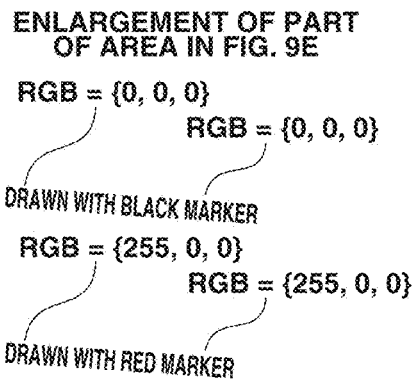

Next, marker portion color replacement processing in step S520 replace a color of the marker area extracted in step S510 with a different color. The marker portion color replacement processing is described in detail below with reference to a flowchart illustrated in FIG. 7. FIG. 9E illustrates an image obtained by replacing colors of the areas drawn with the markers in FIG. 9D with a specific color. FIG. 9E represents that the visibility of the portions drawn with the markers is improved by the marker portion color replacement processing. FIG. 9F illustrates signal values before processing (enlargement of a partial area in FIG. 9C) and signal values after processing (enlargement of a partial area in FIG. 9E) for describing a difference in color signal values.

Regarding a black marker indicated by the reference numeral 601, red, green and blue (RGB) signal values before processing are eight bits, and colors are difference for each character such as {R, G, B}={50, 60, 40} and {R, G, B}={100, 120, 90}. Further, black is not strictly black and in a gray state and a chromatic color state. On the other hand, the RGB signal values after processing are eight bits, and there is no color difference between characters as {R, G, B}={0, 0, 0}. In addition, it can be seen that the color is in an achromatic color state. Similarly, it can be seen that characters drawn with a red marker indicated by the reference numeral 602 have no color difference therebetween and are converted to clear red.

Finally, marker portion smoothing processing in step S530 performs processing on the image subjected to the color replacement of the area drawn with the marker and perform smoothing processing on a contour of the area drawn with the marker. The marker portion smoothing processing is described in detail below with reference to a flowchart illustrated in FIG. 8. By performing the marker portion smoothing processing, the contour of the marker area of which the color is replaced is smoothed, and an image having better appearance can be generated.

<Marker Portion Extraction Processing>

Figure 6:
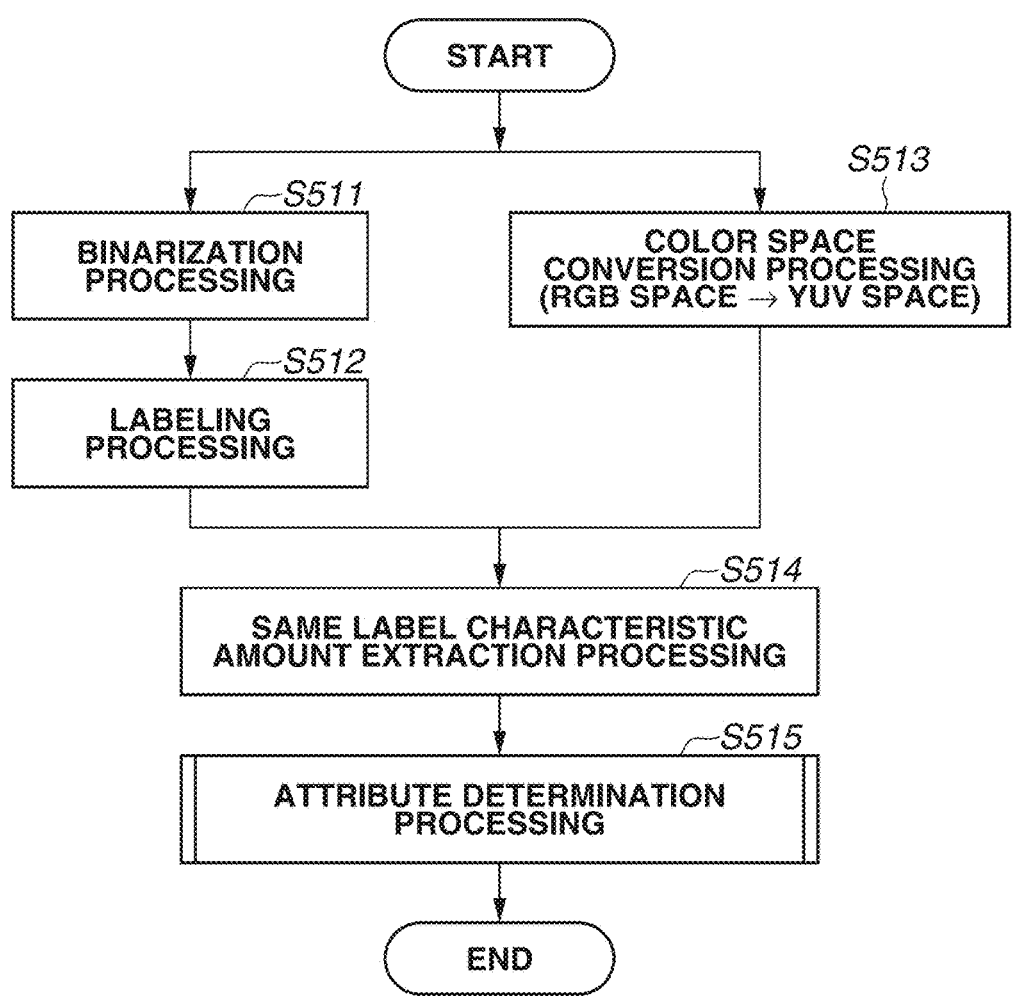
FIG. 6 is a flowchart illustrating marker portion extraction processing according to the first embodiment.
Figure 10B:
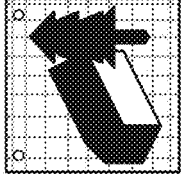
FIG. 10 (including FIGS. 10A and 10B) illustrates examples of the marker portion extraction processing according to the first embodiment.

FIG. 6 is a flowchart illustrating the marker portion extraction processing. FIG. 10 (including FIGS. 10A and 10B) is a schematic diagram of the processing. An area 701 includes characters drawn with the marker, an area 702 includes a line drawing drawn with the marker, an area 703 includes a picture pasted thereon, and an area 704 includes a whiteboard surface area on which nothing is drawn. Image as results of processing in steps S511, S512, S514, and S515 performed on the respective images in the areas 701 to 704 will be described.

In the following steps S511 and S512, a pixel having luminance less than predetermined luminance is regarded as a foreground pixel, and pixels adjacent to each other in the foreground pixels are classified into a same pixel group (label). Accordingly, one or more pixel groups including a plurality of foreground pixels (i.e., a foreground area in the background area) are extracted.

In step S511, binarization processing is performed on the input image using the predetermined luminance as a threshold value to generate a binary image. The binarization processing replaces a pixel having luminance less than the predetermined luminance with a black pixel representing the foreground pixel and replaces a pixel having luminance greater than or equal to the predetermined luminance with a white pixel representing the background pixel. By the binarization processing, the area in which a character or a drawing is drawn with the marker and the area on which a picture is pasted are divided from the whiteboard area on which no character is drawn and no picture is pasted. In other words, the binarization processing separates the input image into the foreground area constituted of the foreground pixels (a colored pixel and a non-white color pixel) and the background area constituted of the background pixels (a white color pixel). A method for performing binarization processing on an image may be a known technique as long as the method can convert an image into two gradations of white and black.

Binary images 705 to 708 are results of the binarization processing performed on the respective areas 701 to 704. It can be seen that gradations included in the image are converted into two gradations of white and black. The input image may be a three channel image including RGB signals or one channel image including only a grey signal. Regarding an image output after the binarization processing, when the input image is the three channel image including RGB signals, the binarization processing may be performed on each channel, and the image is synthesized with the one channel image, or the binarization processing may be performed by converting the RGB signals into luminance signals. As a determination method of the threshold value for performing the binarization processing, the same fixed value may be used for any image, or a method for determining the threshold value from histogram for each input image using a discrimination analysis method may be adopted. Further, a fixed threshold value may be uniformly used in an image surface, or a method for changing the threshold value for each pixel may be adopted. In this regard, the processing in step S511 is not limited to the binarization processing, and a method may be adopted as long as the method can convert the input image into the two gradations of white and black, such as edge extraction processing for dividing into an edge pixel and a non-edge pixel. Further, as the input image to be processed, an image subjected to the shadow removal is used according to the present embodiment, however, an image before shadow removal may be binarized.

In step S512, labeling processing is performed on the binary image. The labeling processing classifies adjacent black pixels into a same label (the pixel group) based on the fact that the black pixels are adjacent to each other. The labeling processing extracts the pixel group based on an adjacent relationship of the black pixels, namely an adjacent relationship of the foreground pixels, and thus characters which are written by hand with the marker and vary in size can be suitably extracted as the pixel group. In addition, since the pixels are classified into the labels, characteristic amounts such as sizes and chromatic dispersion values can be obtained for each pixel group with the same label as described below, and thus attribute determination can be performed on each pixel group.

As a method of the labeling processing on an image, the black pixels (or the white pixels) which are continuous in vertical, horizontal, and oblique directions are applied with the same label and regarded as one pixel group in the pixels of two gradations. A group of non-continuous pixels may be applied with a different label. A method for detecting continuous pixels may be 4-connected for detecting a continuous label in the vertical and horizontal directions or 8-connected for detecting a continuous label in the vertical, horizontal, and oblique directions. Labeled binary images 709 to 712 are results of the labeling processing performed on the respective binary images 705 to 708 in FIG. 10. It can be seen that the same label is applied to each connected pixels in the binarized pixels.

In order to extract the characteristic amount for each label (for each pixel group) in step S514 described below, in step S513, color space conversion processing is performed on the input image to generate a color converted image. Specifically, the input image having a color space of the RGB signals is converted into an image having a color space of YUV signals. The color space is converted into the color space of the YUV signals, and thus a color can be expressed by a combination of luminance (Y) and color difference (difference U between the luminance and blue and difference V between the luminance and read), and a color type can be accurately determined from a color difference signal value.

The color space to be converted is described as the YUV color space according to the present embodiment, however, the color space may be the one expressed by the luminance and the color difference such as a YCbCr color space or may be the RGB color space as it is if the color type can be determined. According to the present embodiment, the color space conversion processing is performed on all pixels in the image, however, the color space conversion processing is not required to be performed on all pixels in the image and may be performed on only a pixel determined as the foreground pixel by the binarization processing in step S511.

As described above, the input image, the labeled binary image, and a multi-level image in the YUV color space correspond to each other. In other words, it can be said that a pixel in the input image on certain coordinates has, as attributes of the pixel, a label of a pixel in the labeled binary image on coordinates the same as the certain coordinates and YUV signal values of a pixel in a YUV multi-level image on the coordinates the same as the certain coordinates.

In step S514, characteristic amount extraction processing is performed on each pixel group having the same label by referring to the labeled binary image and the YUV multi-level image. The extracted characteristic amount is used when attribute determination is performed for each same label which is described below. Specifically, the characteristic amounts such as a circumscribed rectangle size of the label, the number of pixels constituting the label, an average color and a chromatic dispersion value corresponding to the label are extracted by the extraction processing for each label. Characteristic amount extraction results 713 to 716 are results of extraction of the characteristic amounts for each label with respect to the respective labels of the labeled binary images 709 to 712 in FIG. 10. It can be seen that the characteristic amounts can be obtained for each same label.

Regarding the circumscribed rectangle size of the label, a circumscribed rectangle of the pixel group having the same label is obtained, and a width and a height of the circumscribed rectangle are obtained as the circumscribed rectangle size.

The number of pixels of the label is obtained by counting the number of pixels constituting the label.

The average color of the label is obtained by accumulating the YUV signal values (color values) of each pixel corresponding to the same label in the color converted image and dividing the accumulated YUV signal values by the number of pixels included in the pixel group having the same label. Regarding the average color, histograms of the YUV signal values of the pixels included in the pixel group having the same label are generated, and each YUV signal value having the maximum frequency of each histogram may be regarded as the average color.

The chromatic dispersion value of the label can be calculated by obtaining each dispersion value of the YUV signal values of each pixel corresponding to the same label in the color converted image.

An average value and chromatic dispersion of the YUV signal values may be calculated for each of the Y, U, and V channels (three channels) or for only two of U and V channels which most contribute to the color determination. In addition, the chromatic dispersion value may be a characteristic amount obtained by another method as long as the amount is an index representing a dispersion degree of color (in other words, a degree of similarity) in the pixel group having the same label. For example, a standard deviation calculating a positive square root of dispersion or a covariance value of the U signal and the V signal may be used.

Figure 11:
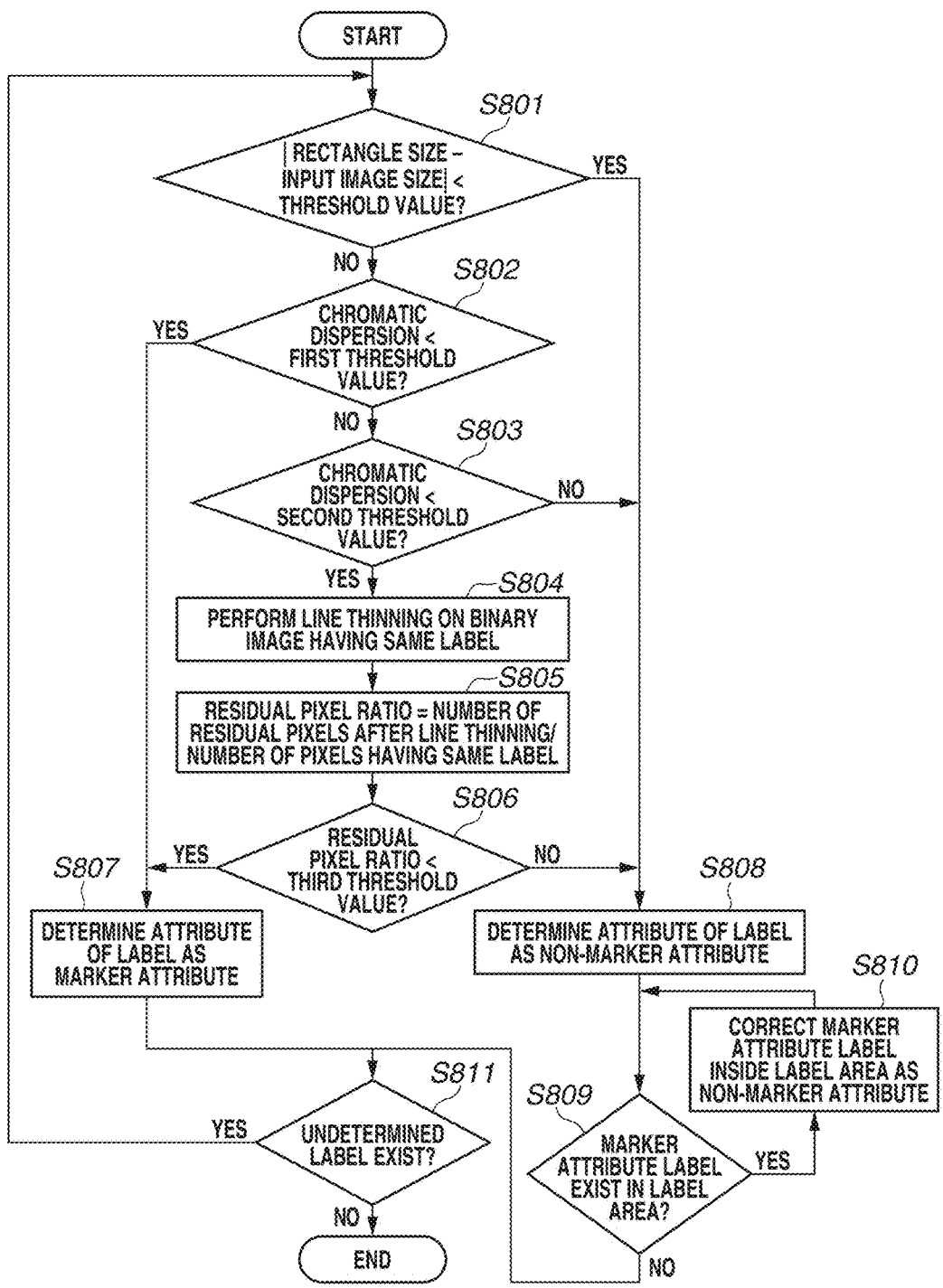
FIG. 11 is a flowchart illustrating attribute determination processing according to the first embodiment.

In step S515, attribute determination processing is performed on each label based on the characteristic amount extracted for each label in step S514. The attribute determination processing illustrated in FIG. 11 is performed, and thus attributes can be distinguished into that of the area drawn with the marker and that of the area which is not drawn with the marker such as the area on which a picture is pasted for each same label. The attribute determination processing may be processing which can determine the area drawn with the marker and the area other than that for each same label.

The attribute determination processing is described in detail below with reference to a flowchart illustrated in FIG. 11. The attribute determination processing determines whether a foreground portion (a marker attribute) drawn with the marker or a foreground portion (a non-marker attribute), such as a picture, not drawn with the marker for each label based on the characteristic amount obtained by the characteristic amount extraction processing.

On the white surface of the whiteboard, a character may be written with the marker or a sheet such as a picture may be pasted. The attribute determination processing determines whether a colored foreground pixel group in a captured image is drawn with a single color marker or a picture using many colors based on the circumscribed rectangle size of the pixel group, the number of pixels constituting the pixel group, the average color of the pixel group, and the chromatic dispersion value of the pixel group.

The processing described below is repeated for each label in an ascending order of the circumscribed rectangle size of the labels until no processing target label is left.

In step S801, the circumscribed rectangle size of the label and the input image size are compared and determined. Specifically, it is determined whether an absolute value of a difference between a width of the rectangle size and a width of the input image size is less than a threshold value and an absolute value of a difference between a height of the rectangle size and a height of the input image size is less than a threshold value. By the determination, a label having the circumscribed rectangle approximately matching with the input image size is regarded a portion not drawn with the marker in the whiteboard, and in the case that the absolute value of the difference in the width and the absolute value of the difference in the height are both less than the threshold values (YES in step S801), the processing proceeds to step S808. Other than that (NO in step S801), there is a possibility that the pixel group with the label is a portion drawn with the marker in the whiteboard, and thus the processing proceeds to step S802 for further determination.

In step S802, it is determined whether the chromatic dispersion value of the label is less than a first threshold value. Specifically, it is determined whether the dispersion value of the U signal value and the dispersion value of the V signal value are both less than the first threshold value. In the case that both of the dispersion value of the U signal value and the dispersion value of the V signal value are less than the first threshold value (YES in step S802), the processing proceeds to step S807. Other than that (NO in step S802), the processing proceeds to step S803.

More specifically, in step S802, the pixel group constituted of similar color pixels of which the dispersion values of the U signal value and the V signal value are both less than the first threshold value is determined as having the marker attribute. In other words, in step S802, an almost single color area (i.e., the foreground area constituted of continuous similar color pixels) surrounded by an almost white area (i.e., the background area) is specified as an area subjected to color replacement processing described below. When an image of a character and a drawing drawn with a single color on the whiteboard surface is captured, the chromatic dispersion value becomes very small on each label basis. On the other hand, when a color picture is pasted on the whiteboard surface, the dispersion value of either of the U signal value and the V signal value becomes large in the label, and thus it is determined as having the non-marker attribute in that case.

The threshold value compared with the dispersion value of the U signal value and the threshold value compared with the dispersion value of the V signal value may be different threshold values. In addition, recognizability of a change (dispersion degree) in the U signal value (or the V signal value) for human eyes varies depending on the Y signal value, the threshold value of the U signal value (and the V signal value) may be changed in response to the Y signal value.

In step S803, as with the step S802, it is determined whether the chromatic dispersion values of the YUV signal values are less than a second threshold value. In the case that the chromatic dispersion value is less than the second threshold value (i.e., when the chromatic dispersion value is greater than or equal to the first threshold value and less than the second threshold value, YES in step S803), the processing proceeds to step S804. The second threshold value is greater than the first threshold value used in step S802. In other words, the processing in step S804 and subsequent steps is performed on the pixel group which is difficult to be determined whether to be constituted of the similar color pixels or not by the determination in step S803. In the case that the chromatic dispersion value is greater than or equal to the second threshold value (NO in step S803), the processing proceeds to step S808. In other words, the pixel group having the label of which the chromatic dispersion value is greater than or equal to the second threshold value is regarded as having the non-marker attribute as described below, and the color replacement described below is not performed thereon.

Figure 12A:
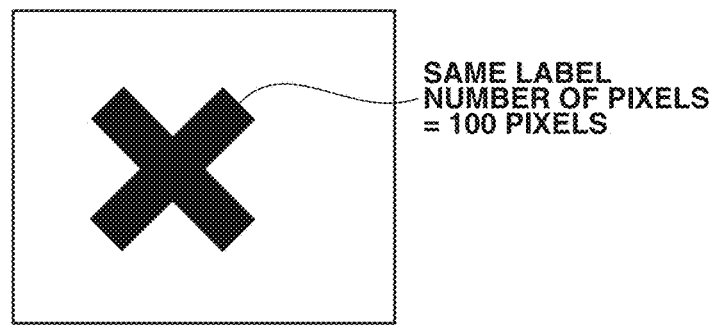
FIGS. 12A to 12C illustrate examples of the attribute determination processing according to the first embodiment.
Figure 12B:
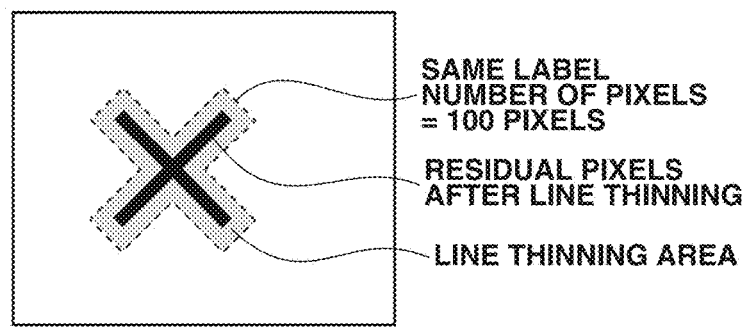

In step S804, the pixel group of the processing target label in the binary image generated in step S511 is extracted, and line thinning processing is performed on the extracted pixel group. The line thinning processing (contraction processing of the black pixel or expansion processing of the white pixel) is performed on a binary image having the same label illustrated in FIG. 12A, and an image in FIG. 12B is generated. The line thinning processing is performed in step S804, and then the processing proceeds to step S805.

In step S805, the number of the black pixels after the line thinning processing (the number of residual pixels) is counted, and a ratio of the number of residual pixels to the number of pixels constituting the pixel group of the original label (a residual pixel ratio) is calculated. The processing based on a concept that when the residual pixel ratio is less than a threshold value, the pixel group corresponds to a portion drawn with the marker on the assumption that a line of the marker drawn on the whiteboard has a predetermined thinness.

For example, the number of residual pixels after the line thinning processing illustrated in FIG. 12B is counted, and the residual pixel ratio is calculated using a following formula.

Residual pixel ratio=(the number of residual pixels after line thinning/the number of pixels of the same label)*100

In step S806, it is determined whether the calculated residual pixel ratio is less than a third threshold value. In the case that the residual pixel ratio is less than the third threshold value (YES in step S806), the processing proceeds to step S807. Other than that (NO in step S806), the processing proceeds to step S808. The third threshold value is set, for example, to 50%, and the label in which the residual pixel ratio<50% is established is determined as having the marker attribute, the label in which the inequality is not established is determined as having the non-marker attribute. In the case of a character having a three-pixel line width drawn with the marker, when the line thinning of one pixel is performed, the residual pixel ratio falls below 50%, and thus the character can be determined as having the marker attribute. According to the present embodiment, the method for calculating the residual pixel ratio by performing the line thinning processing is described, the processing is not limited to the above-described one, and processing which can extract a line width of a label and determine whether the line width is thick or thin can be adopted.

In step S806, in the case that the residual pixel ratio is greater than or equal to the third threshold value (NO in step S806), the processing proceeds to step S808.

In step S807, the attribute of the processing target label is determined as the marker attribute.

In step S808, the attribute of the processing target label is determined as the non-marker attribute.

In step S809, it is determined whether a label having the marker attribute exists in an area surrounded by the processing target label determined as having the non-marker attribute. It is highly likely that another label surrounded by the label determined as having the non-marker attribute has the non-marker attribute, and thus the determination processing is performed to correct the attribute of the another label.

Figure 12C:
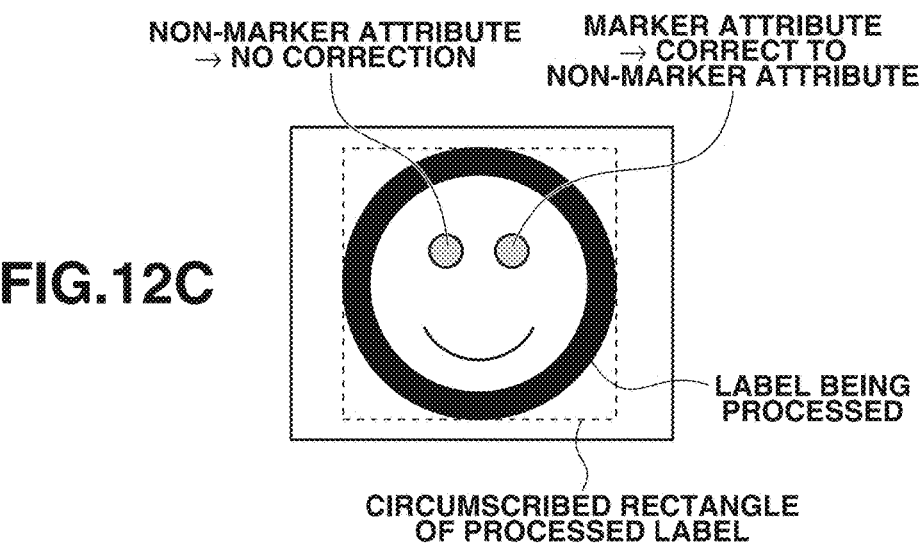

The processing is described with reference to FIG. 12C. In FIG. 12C, the label having the marker attribute and the label having the non-marker attribute exist within an area surrounded by the label being processed. Determination of the inside of the area surrounded by the label being processed can be performed by obtaining a circumscribed rectangle of the label being processed and determining whether a label other than the one being processed exists within the area. In the case that the label having the marker attribute exists within the surrounded area (YES in step S809), the processing proceeds to step S810. The label having the non-marker attribute is not processed.

In step S810, the attribute of the label having the marker attribute found by the processing in step S809 is corrected to the non-marker attribute. The processing is repeated until the attributes of all the labels having the marker attribute within the area surrounded by the processing target labels having the non-marker attribute are corrected.

In step S811, it is determined whether the determination is completed on the all labels, and in the case that there is a label not determined yet (YES in step S811), the attribute determination is performed on the next label. In the case that the determination is completed on the all labels (NO in step S811), the processing illustrated in FIG. 11 is terminated.

By performing the above-described processing, the character drawn with the marker described by the characteristic amount extraction result 713 and the line drawing drawn with the marker described by the characteristic amount extraction result 714 in FIG. 10 have low chromatic dispersion values and thin objects, and thus they can be determined as having the marker attribute. On the other hand, the area on which the picture is pasted described by the characteristic amount extraction result 715 has a high chromatic dispersion value and a high residual pixel ratio, and thus the area can be determined as having the non-marker attribute.

As described above, the processing in steps S511 to S515 is performed, the marker portion extraction processing in step S510 is completed, and the marker portion color replacement processing in the following step S520 is performed.

Figure 7:
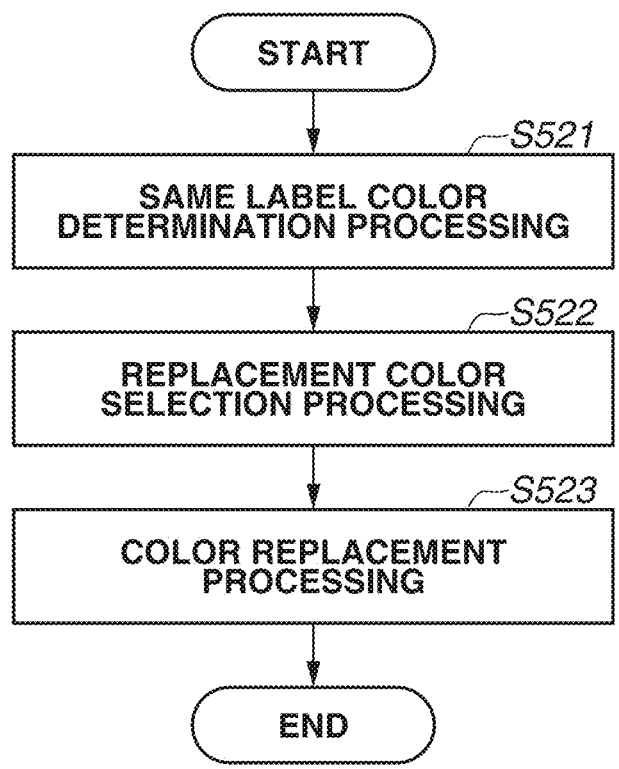
FIG. 7 is a flowchart illustrating marker portion color replacement processing according to the first embodiment.

FIG. 7 is a flowchart illustrating the marker portion color replacement processing. The processing replaces a signal value (a gradation value) of each pixel included in the pixel group with a signal value (a gradation value) of a color based on a color of the pixel included in the pixel group of the same label having the marker attribute. In other words, the processing replaces the color of the pixel group determined as constituted of the similar color pixels with one color obtained based on the color of at least one pixel constituting the pixel group.

In step S521, same label color determination processing is performed on each label (i.e., each pixel group). In step S521, the average color in the YUV color space of each label extracted in the above-described step S514 and a distance (similarity) from a plurality of predetermined reference colors (black, red, blue, and green) are calculated, and it is determined which reference color the average color is close to.

For example, differences between signal values of the color differences (the U channel and the V channel) of the average color having a certain label and signal values of the color differences (the U channel and the V channel) corresponding to each of the reference colors are respectively calculated, and a square root of a sum of square values of the respective differences is calculated. A color difference signal value corresponding to each reference color is stored in the image processing unit 406. In other words, a distance between the color difference of the average color and the color difference of each reference color is calculated. Further, the reference color in the closest distance (i.e., the reference color having the smallest square root) in the calculated distances to each of the reference colors is determined as the color of the label. For example, the labels of the reference numerals 601 to 604 illustrated in FIG. 9B are respectively determined as black, red, blue, and green.

In step S522, replacement color selection processing is performed on each label. The processing selects RGB values corresponding to the reference color determined in step S521 for each label and assigns the RGB values to the label. Therefore, a color (RGB values) assigned to a certain label is determined without depending on a color of the pixel group having a different label (another foreground area in the background area). For example, in the case of a label determined as black, RGB signal values {R, G, B}={0, 0, 0} are assigned to the label. In the case of red, RGB signal values {R, G, B}={255, 0, 0} are assigned. In the case of green, RGB signal values {R, G, B}={0, 255, 0} are assigned. In the case of blue, RGB signal values {R, G, B}={0, 0, 255} are assigned. The RGB signal values are stored in advance in a table for each reference color. The table is stored in the image processing unit 406. However, the following processing may be performed. In a case where the distance between a pixel group having a first label that has a size equal to or larger than a threshold size and a pixel group having a second label that has a size smaller than the threshold size is less than a threshold distance, and the color assigned to the first label and the color assigned to the second label are different from each other, the color assigned to the second label is changed (modified) to the color assigned to the first label.

As illustrated in an upper part of FIG. 9F, even in the case that the signal values are different like the RGB signal values {R, G, B}={50, 60, 40} and {100, 120, 90}, the RGB signal values are uniformly converted into {0, 0, 0} when it is determined as black in step S521. Similarly, as illustrated in a lower part of FIG. 9F, the RGB signal values of portions in the input image having RGB signal values {R, G, B}={200, 30, 20} and {180, 40, 40} are converted into {255, 0, 0} when it is determined as red in step S521.

In step S523, the color replacement processing is performed on each label. The color replacement processing replaces a color of each pixel constituting the pixel group in the input image corresponding to the pixel group of each label with the color assigned in step S522. Specifically, the color replacement processing replaces the RGB signal values (gradation values) of the pixel group in the input image corresponding to the pixel group having the same label in the labeled binary image with the RGB signal values assigned to the label. By the color replacement processing, the signal values of the same labels are unified and replaced with one color, and thus the color of the marker drawn on the whiteboard can be distinguished from a picture and brilliantly corrected. Even in the pixel groups having the different labels, the pixel groups having the different labels are replaced with the same one color when the same selected color is assigned. Thus, the color in the image can have a sense of unity.

As described above, the processing in steps S521 to S523 is performed, the marker portion replacement processing in step S520 is completed, and the marker portion smoothing processing in the following step S530 is performed.

Figure 8:
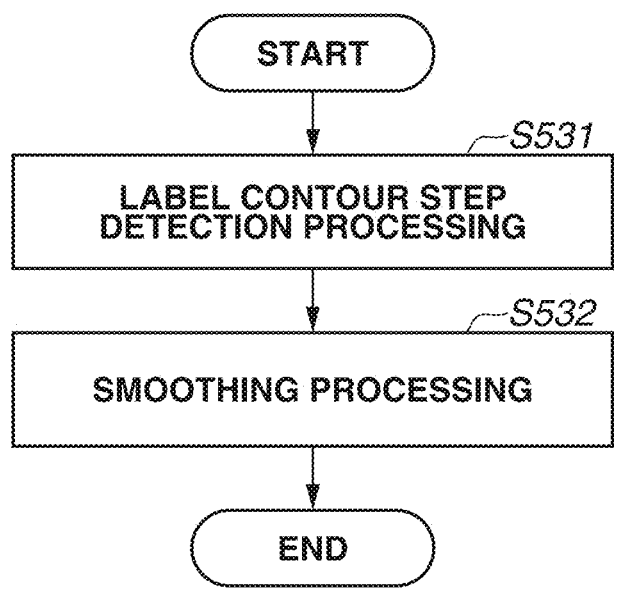
FIG. 8 is a flowchart illustrating marker portion smoothing processing according to the first embodiment.
Figure 13A:
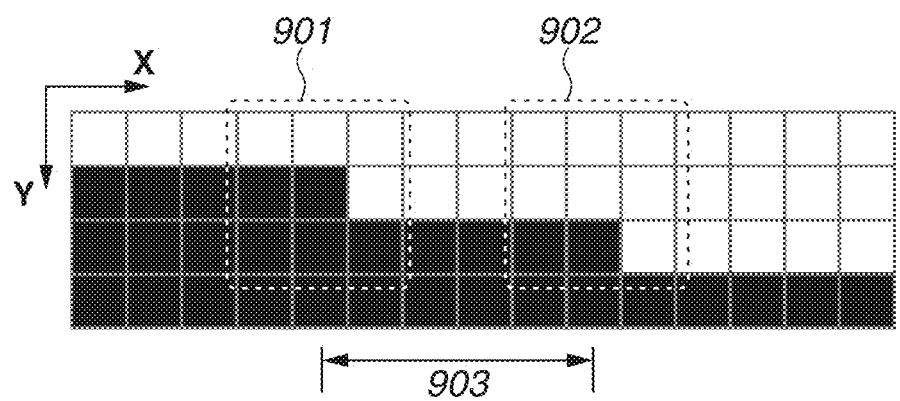
FIGS. 13A and 13B illustrate examples of the marker portion smoothing processing according to the first embodiment.
Figure 13B:
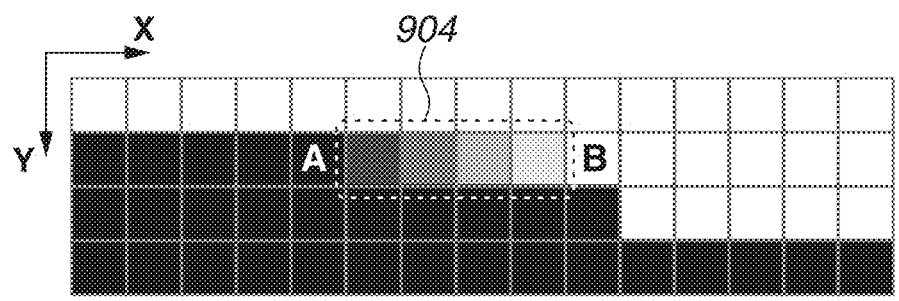

FIG. 8 is a flowchart illustrating the marker portion smoothing processing. The marker portion replacement processing in step S520 replaces the RGB signal values of the pixel in the input image corresponding to the pixel group having the same label in the labeled binary image with the RGB signal values of the one color. The pixel group having the same label (the labeled binary image) is formed based on the binary image generated by the binarization processing in step S511. Thus, a jaggy (step) is noticeable in a contour shape of the pixel group in the input image of which the color is replaced as illustrated in FIG. 13A. Thus, the marker portion smoothing processing smooths the step as illustrated in FIG. 13B.

Steps S531 and S532 are described with reference to FIGS. 13A and 13B. In the steps S531 and S532, the smoothing processing is performed on a contour of the pixel group subjected to the color replacement processing by adding a multi-level pixel based on the determination result of the attribute determination processing and the contour shape of the pixel group having the same label. In other words, in steps S531 and S532, a position on the contour to be added with the multi-level pixel and a gradation value of the pixel to be added thereto are determined based on the contour shape of the pixel group with the same label having the marker attribute, and the pixel having the gradation value is added to the position.

In step S531, label contour step detection processing is performed. In step S531, the contour of the pixel group with the label having the marker attribute is traced by pattern matching, and a specific step is detected. In FIG. 13A, the contour of the pixel group in the labeled binary image is indicated by the black pixels, and a step of one pixel in the black pixels indicated by a pattern 901 is regarded as the specific step. The contour is traced, and the pattern matching is performed for detecting a three pixel by three-pixel pattern indicated by the pattern 901. When the pattern 901 is detected, detection by the pattern matching is further advanced from there to an X direction, and a three pixel by three-pixel pattern indicated by a pattern 902 is detected. In this regard, the number of pixels 903 from the pattern 901 to the pattern 902 is counted.

In step S532, the smoothing processing is performed based on the step detected from the labeled binary image. Definition enhancement is performed on the step detected in step S531 at a pinpoint by adding a filter and the multi-level pixel, and thus the jaggy is reduced. In other words, in step S532, a color of at least one pixel adjacent to the pixel group subjected to the color replacement processing in step S523 in the input image is replaced with a color for smoothing the contour of the pixel group. FIG. 13B illustrates a result of smoothing a gap between the pattern 901 and the pattern 902. FIG. 13B illustrates that a signal value of the multi-level pixel to be added to a contour area 904 of the pixel group is determined from RGB signal values (signal value A) of a pixel of A coordinates and RGB signal values (signal value B) of a pixel of B coordinates, and the number of pixels 903. The determined signal value is a color for smoothing the contour of the pixel group. For example, if the number of pixels 903 is five pixels between the A coordinates and the B coordinates, gradation values of four pixels in the contour area 904 may be set to a gradation value gradually changing from the signal value A to the signal value B. In other words, the gradation value is gradationally changed in the contour area 904.

The processing in steps S531 to S532 is performed, and the marker portion smoothing processing in step S530 is completed.

The processing for detecting and smoothing the specific step in the area drawn with the marker is described above, however, the smoothing processing may be performed by a uniform smoothing filter with respect to a pixel having the marker attribute.

By performing the above-described processing, the area drawn with the marker and the area not drawn with the marker can be accurately classified in the input image. Dedicated image processing such as the color replacement processing can be performed on the area drawn with the marker after classifying the areas, so that the visibility of the marker drawn area can be improved, and the issue that the color of the marker is difficult to be distinguished can be addressed. In addition, the processing is not performed on the area not drawn with the marker, so that deterioration in an image quality can be prevented in the non-marker drawn area.

According to the present embodiment, the marker portion color replacement processing (step S520) and the marker portion smoothing processing (step S530) are sequentially performed on the input image, however, the processing may be performed as described below. In step S523, a multi-level image is generated by converting the black pixel group having the marker attribute in the labeled binary image into the pixel group having a multi-level signal value selected in steps S521 and S522. In step S531, the step is detected by tracing the contour of the pixel group having the multi-level signal value from the generated multi-level image, and in step S532, the step is smoothed by a color (signal value) determined by the color (signal value) of the pixel group based on the detected step and a shape thereof. Further, in step S532, the multi-level image which is subjected to the smoothing in the all pixel groups is synthesized with the input image. In the synthesis, only a pixel other than white and a white pixel adjacent to the relevant pixel in the smoothed multi-level image are overwritten to corresponding pixels in the input image. By this processing, the pixel group which is replaced with a single color and subjected to the smoothing processing can be synthesized with the input image.

According to the first embodiment, the processing for replacing a color determined for each label with respect to the same label with a color determined in advance is performed. However, as the color determined in advance, colors often used as marker colors (such as black, red, blue, and green) are determined, however, when there is a special color other than the color determined in advance, replacement cannot be performed in some cases.

Thus, according to a second embodiment, a configuration is described which can automatically determine a replacement color when the replacement color is not determined in advance.

Figure 14:
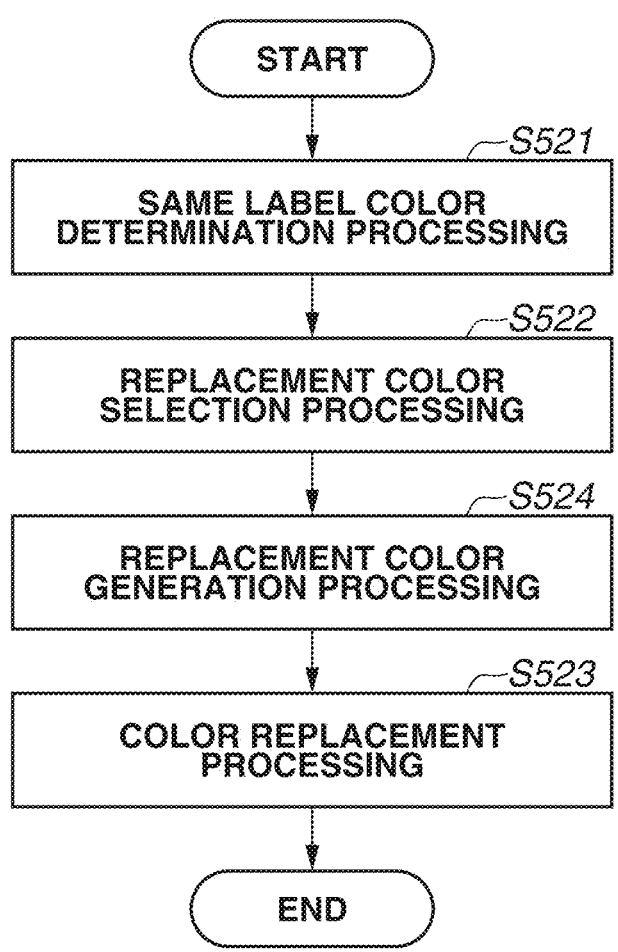
FIG. 14 is a flowchart illustrating marker portion color replacement processing according to a second embodiment.

FIG. 14 is a flowchart illustrating the marker portion color replacement processing which includes processing for automatically determining a replacement color when the replacement color is not determined in advance according to the present embodiment. FIG. 14 includes the replacement color generation processing in step S524 in addition to the configuration in FIG. 7.

In step S521, the same label color determination processing is performed on each label. In step S521, when the average color of the label is not within a predetermined distance from any of the reference colors, it is determined that there is no replacement color of the label.

Subsequently, in step S522, the replacement color is selected for each label from a replacement color table determined in advance similarly to the first embodiment. However, when it is determined that there is no replacement color of the label in step S521, in step S522, the replacement color of the label is not selected from the table. The replacement color of the such label is determined by the replacement color generation processing in the next step S524.

In step S524, the replacement color generation processing is performed on the label which is determined that no replacement color exists in step S521. Specifically, in step S524, the replacement color of the label is determined based on the average color in the YUV space of the label. A determination method includes following methods as examples. There is a method which converts the average color (the YUV signal values) of the label into the RGB signal values and regards the RGB signal values as the replacement color. Further, there is a method which converts the average color (the YUV signal values) into signal values of an HSV color space (HSV signal values), increases a saturation signal value by a predetermined amount, and regards values converting the HSV signal values into the RGB signal values as the replacement color.

Further, in step S523, the color replacement processing is performed using the replacement color of each label similarly to the first embodiment.

By performing the above-described processing, when the color replacement processing is performed on the area drawn with the marker, the replacement color is automatically generated if the replacement color is not determined, and the color of the marker drawn area can be replaced.

According to the first and the second embodiments, one color is determined for the same label, and the replacement processing is performed. However, when a plurality of pixel groups with different colors exist in the same label, there is a possibility that color information may be lost if the colors are replaced with one color. In addition, regarding the pixel group with the label having the chromatic dispersion value in the periphery of the first threshold value in step S802 according to the first embodiment, there is a possibility that the same label is assigned to the pixel group which includes pixel groups of two colors. Thus, according to a third embodiment, a configuration is described which can set a plurality of colors to the same label and perform the replacement.

Figure 15:
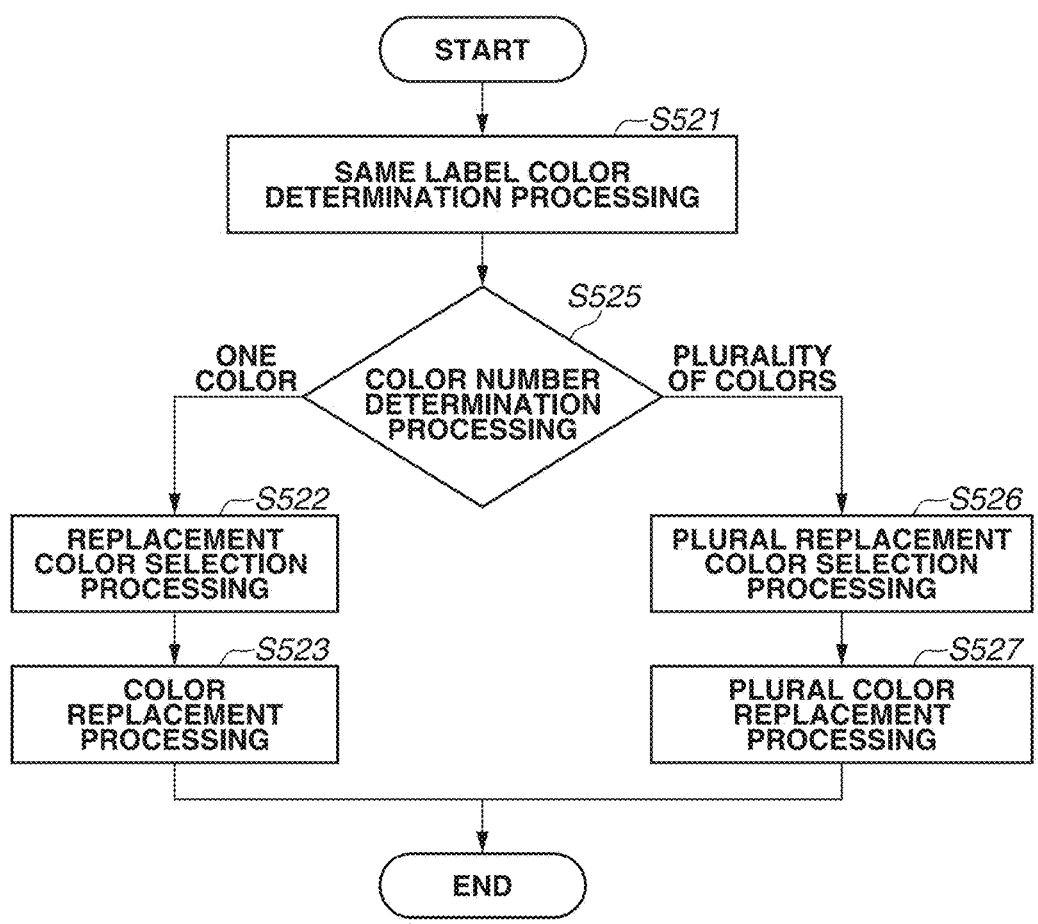
FIG. 15 is a flowchart illustrating marker portion color replacement processing according to a third embodiment.

FIG. 15 is a flowchart illustrating the marker portion color replacement processing which includes processing for selecting a plurality of colors and processing for replacing with a plurality of colors according to the present embodiment. In FIG. 15, steps S525, S526, and S527 are added to the configuration in FIG. 7.

In step S521, the same label color determination processing is performed on each label. In step S521, when the average color of the label is not within a predetermined distance from any of the reference colors, following clustering processing is performed on the label. The clustering is performed on the UV signal values of a pixel in the multi-level image in the YUV color space corresponding to each pixel constituting the pixel group of the label. As the clustering, known clustering methods referred to as, for example, a k-means method and a density-based spatial clustering (DBSCAN) can be used. The UV signal values of centroids of one or more clusters obtained as a result of the clustering will be the UV signal values of the replacement colors for colors of pixels constituting the pixel group of the label.

In step S525, color number determination processing is performed. The color number determination processing determines whether the number of colors used in the label is one color or a plurality of colors based on the chromatic dispersion value of the YUV color space of the processing target label and the number of clusters as the result of the clustering in step S521. In the case that the chromatic dispersion value is greater than or equal to the threshold value, or the number of clusters is two or more, it is determined to be replaced with the plurality of colors (PLURALITY OF COLORS in step S525), and the processing proceeds to step S526. In contrast, when the chromatic dispersion value is less than the threshold value, and the number of clusters is only one, it is determined to be replaced with one color (ONE COLOR in step S525), and the processing proceeds to step S522 similarly to the first and the second embodiments.

In step S526, plural replacement color selection processing is performed. In the processing, each of the RGB signal values determined based on the UV signal values of the center of each cluster obtained as the result of the clustering performed in step S521 is determined as a plurality of replacement colors.

In step S527, plural color replacement processing is performed. In the plural color replacement processing, the same label is not replaced with one color, but the pixel group of the label is replaced with the plurality of colors. Specifically, it is determined which RGB value each pixel constituting the pixel group in the input image corresponding to the label is close to in the RGB values of the plurality of colors determined in step S526, and the RGB values of the pixel in the input image are replaced with the determined RGB values.

The configuration for setting a plurality of colors when performing the color replacement in the present processing is described, however, labeling may be performed using the color information when the labeling processing is performed in S512, and thus the label can be divided at a point of which color difference is greater than or equal to the threshold value.

By performing the above-described processing, the same label can be replaced with a plurality of colors when the color replacement processing is performed on the area drawn with the marker.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-145740, filed Jul. 25, 2016, which is hereby incorporated by reference herein in its entirety.

What is claimed is:

1. An image processing method executed by an apparatus for processing an input image, the image processing method comprising:
    binarizing the input image to generate a binary image;
    extracting a plurality of foreground areas based on the generated binary image;
    determining whether each of the plurality of foreground areas is subject to a color replacement;
    selecting, for each foreground area determined to be subject to the color replacement, one color from among a plurality of predetermined colors, based on colors of a plurality of pixels included in each determined foreground area; and
    replacing colors of the plurality of pixels included in each determined foreground area with the selected one color to generate a revised image.

2. The image processing method according to claim 1, wherein determining whether each of the plurality of foreground areas is subject to a color replacement is based on a similarity of colors of the plurality of pixels included in each determined foreground area.

3. The image processing method according to claim 2, wherein the similarity is evaluated by a variance of the colors of the plurality of pixels included in each determined foreground area.

4. The image processing method according to claim 3, wherein the variance is a variance of color-difference components of the colors of the plurality of pixels.

5. The image processing method according to claim 1, wherein the plurality of predetermined colors includes a predetermined red, a predetermined blue, and a predetermined black.

6. The image processing method according to claim 1, wherein selecting one color for each determined foreground area is performed based on a representative color value of the colors of the plurality of pixels included in each determined foreground area and color values of the plurality of predetermined colors.

7. The image processing method according to claim 1, wherein selecting one color for each determined foreground area includes:
    determining whether an average color of a plurality of pixels included in each determined foreground area is within a predetermined distance from any of the plurality of predetermined colors,
    selecting one color from among the plurality of predetermined colors in a case where the average color is within the predetermined distance from any of the plurality of predetermined colors, and
    selecting a color generated based on colors of the plurality of pixels included in a determined foreground area in a case where the average color is not within the predetermined distance from any of the plurality of predetermined colors.

8. The image processing method according to claim 1 further comprising displaying the image including pixels whose colors have been replaced with the selected one color.

9. The image processing apparatus according to claim 1 further comprising smoothing a contour of a foreground area whose colors have been replaced with the selected one color.

10. The image processing method according to claim 9, wherein smoothing includes determining, based on a shape of the contour, a color with which a color of at least one pixel adjacent to the contour is to be replaced, and replacing the at least one adjacent pixel with the determined color.

11. The image processing method according to claim 1, wherein the input image is an image of a whiteboard captured by an image capturing unit,
    wherein the plurality of foreground areas includes a portion in the whiteboard drawn with a marker pen by a user, and
    wherein the replaced colors of the plurality of pixels are black from a first marker image on the whiteboard and the selected one color is blue as representative of a blue marker image as drawn on the whiteboard.

12. The image processing method according to claim 1, wherein the plurality of foreground areas is extracted by performing a labeling process for the generated binary image.

13. The image processing method according to claim 1, wherein determining whether each of the plurality of foreground areas is subject to a color replacement based on sizes of each of the extracted plurality of foreground areas and a similarity of colors of the plurality of pixels included in each determined foreground area.

14. The image processing method according to claim 1, wherein selecting one color for each determined foreground area includes:
    determining whether a number of colors used in each determined foreground area is one color or a plurality of colors by performing a clustering process for each determined foreground area,
    selecting one color from among the plurality of predetermined colors in a case where it is determined that the number of colors used in each determined foreground area is one color, and
    selecting plural replacement colors in a case where it is determined that the number of colors used in each determined foreground area is a plurality of colors, and
    wherein replacing colors of the plurality of pixels includes:
    replacing colors of the plurality of pixels included in each determined foreground area with the selected one color in a case where it is determined that the number of colors used in each determined foreground area is one color, and
    replacing colors of the plurality of pixels included in each determined foreground area with the selected plural replacement colors in a case where it is determined that the number of colors used in each determined foreground area is a plurality of colors.

15. An imaging device for processing an input image, comprising:

one or more processors; and memory storing instructions that, when executed by the one or more processors, cause the imaging device to perform operations including:

binarizing the input image to generate a binary image, extracting a plurality of foreground areas based on the generated binary image, determining whether each of the plurality of foreground areas is subject to a color replacement, selecting, for each foreground area determined to be subject to the color replacement, one color from among a plurality of predetermined colors, based on colors of a plurality of pixels included in each determined foreground area, and replacing colors of the plurality of pixels included in each determined foreground area with the selected one color to generate a revised image.

16. A non-transitory computer-readable storage medium storing a program to cause a processor to perform an image processing method executed by an apparatus for processing an input image, the image processing method comprising:

binarizing the input image to generate a binary image;

extracting a plurality of foreground areas based on the generated binary image;

determining whether each of the plurality of foreground areas is subject to a color replacement;

selecting, for each foreground area determined to be subject to the color replacement, one color from among a plurality of predetermined colors, based on colors of a plurality of pixels included in each determined foreground area; and replacing colors of the plurality of pixels included in each determined foreground area with the selected one color to generate a revised image.

* * * * *